United States Patent Office 2,742,463
Patented Apr. 17, 1956

2,742,463

DICHLOROSTYRYLPYRIDINIUM COMPOUNDS

Jacob Finkelstein, West Englewood, N. J., assignor to Hoffmann-La Roche Inc., Nutley, N. J., a corporation of New Jersey No Drawing. Application March 26, 1953, Serial No. 344,899

1 Claim. (Cl. 260—240)

This invention relates to dichlorostyrylpyridinium salts, particularly to 1-alkyl-pyridinium halides substituted in the 2 or 4 position by a dichlorostyryl radical. These compounds my be represented respectively by the following formulas:

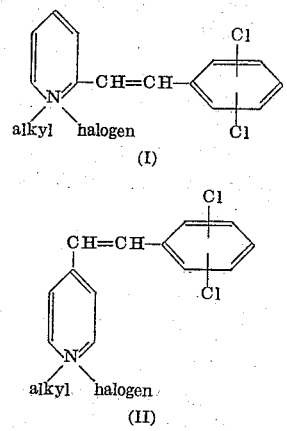

The compounds of this invention are useful as therapeutic agents, more particularly are useful as anthelmintic and amoebicidal agents.

The dichlorostyrylpyridinium compounds may, in general, be prepared by reacting a quaternary salt of α- or γ-picoline, e. g., an alkyl halide, alkyl sulfate, or p-toluene sulfonate with a dihalogenated benzaldehyde in absolute alcohol in the presence of piperidine as catalyst. Alternatively, the compounds of this invention may be prepared by reacting α-picoline with a dihalogenated benzaldehyde in refluxing acetic anhydride to obtain a 2-(dichlorostyryl)pyridine or by reacting γ-picoline in the same manner to obtain a 4-(dichlorostyryl)pyridine. The dichlorostyrylpyridine thus obtained is then quaternized by reaction with a quaternary agent such as an alkyl halide or a substituted alkyl halide to obtain the corresponding 1-alkyl-dichlorostyryl-pyridinium halide salt.

The following examples are illustrative but not limitative of this invention.

Example 1

A solution of 20 g. of α-picoline methiodide and 15 g. of 3,5-dichlorobenzaldehyde in 50 cc. of absolute ethanol containing 3 cc. of piperidine was refluxed. After a short time yellow crystals appeared and the reaction was completed after two hours. After cooling, the yellow product, 1-methyl-2-(3,5-dichlorostyryl)pyridinium idoide was filtered, washed and recrystallized from methanol, M. P. 250–252° C.

Example 2

A mixture of 13.4 g. of α-picoline methiodide and 10 g. of 2,3-dichlorobenzaldehyde in 70 cc. of methanol and 3 cc. of piperidine was refluxed for 16 hours. Upon cooling at 0° C., crystals were deposited. The product was purified by recrystallization from small amounts of methanol and was obtained as a yellow substance. The 1-methyl-2-(2,3-dichlorostyryl)pridinium iodide melted at 236–238° C.

Examples 3 to 6

The following additional 1-methyl-2-(dichlorostyryl)-pyridinium iodides were prepared by the procedure described in Examples 1 and 2:

1-methyl-2-(2,4-dichlorostyryl)pyridinium iodide, M. P. 200–203° C., was prepared by reacting α-picoline methiodide with 2,3-dichlorobenzaldehyde.

1-methyl-2-(2,5-dichlorostyryl)pyridinium iodide (as the monohydrate), M. P. 195–197° C., was prepared by reacting α-picoline methiodide with 2,5-dichlorobenzaldehyde.

1-methyl-2-(2,6-dichlorostyryl)pyridinium iodide, M. P. 217–220° C., was prepared by reacting α-picoline methiodide with 2,6-dichlorobenzaldehyde.

1-methyl-2-(3,4-dichlorostyryl)pyridinium iodide, M. P. 226–231° C., was prepared by reacting α-picoline methiodide with 3,4-dichlorobenzaldehyde.

Example 7

A solution of 8.2 g. of α-picoline ethiodide, 6 g. of 2,5-dichlorobenzaldehyde and 1 cc. of dry piperidine in 50 cc. of methanol was kept at room temperature. After a short time, colorless crystals began to appear. When the amount of crystallized material did not increase, the product was filtered and recrystallized twice from ethanol. After drying in vacuo at 80° C., the 1-ethyl-2-(2,5-dichlorostyryl)pyridinium iodide obtained melted at 158–159° C.

Example 8

93 g. of α-picoline and 165 g. of n-hexyl bromide were heated at 135–140° C. for 24 hours. The dark reaction mixture was cooled, shaken with ether, and cooled in the refrigerator overnight. The α-picoline n-hexyl bromide was collected by filtration and dried at 60° C. The product was too hygroscopic to obtain a sharp melting point.

A mixture of 25.8 g. of α-picoline n-hexyl bromide, 17.5 g. of 3,4-dichlorobenzaldehyde and 3 cc. of dry piperidine in 75 cc. of methanol was refluxed for 1.5 hours. The methanol was distilled in vacuo from a warm water bath and the residual thick syrup was dissolved in hot benzene. Upon cooling, light yellow crystals were obtained. After recrystallization from an ethanol-acetone mixture, the product, 1-n-hexyl-2-(3,4-dichlorostyryl)-pyridinium bromide, was dried in vacuo at 80° C., M. P. 231–235° C.

Example 9

A mixture of 93 g. of dried α-picoline and 193 g. of n-octyl bromide was heated at 135° C. for 40 hours and allowed to cool to room temperature slowly. The reaction product set to a brownish solid mass. After two recrystallizations from methyl ethyl ketone, the quanternary salt, α-picoline n-octyl bromide, was obtained as a colorless crystalline substance which was slightly hygroscopic, M. P. 85–92° C.

A solution of 17.5 g. of 2,5-dichlorobenzaldehyde and 28.6 g. of α-picoline n-octyl bromide in 100 cc. of methanol and 3 cc. of dry piperidine was kept at room temperature until the reaction was complete. The methanol was then distilled off from a water bath in vacuo. The residue was dissolved in warm benzene and allowed to cool. 1 - n - octyl - 2 - (2,5 - dichlorostyryl)pyridinium bromide crystallized out and was washed with acetone, M. P. 97–99° C.

Example 10

A solution of 52.5 g. of 3,4-dichlorobenzaldehyde and 70.5 g. of γ-picoline methiodide in 150 cc. of absolute alcohol containing 5 cc. of piperidine was refluxed for 6 hours. A yellow crystalline compound formed and was recrystallized from methanol. The 1-methyl-4-(3,4-dichlorostyryl)pyridinium iodide melted at 267–274° C.

*Example 11*

A solution of 10.7 g. of γ-picoline methiodide and 8 g. of 2,3-dichlorobenzaldehyde in 50 cc. of methanol with 2 cc. of dry piperidine was refluxed for one hour. A yellow crystalline product formed. After cooling, the compound was filtered off and purified by recrystallization from equal parts of ethanol and water. The 1-methyl-4-(2,3-dichlorostyryl)pyridinium iodide melted at 320–322° C.

*Example 12*

A mixture of 24.2 g. of γ-picoline methiodide and 18 g. of 2,5-dichlorobenaldehyde in 50 cc. of absolute alcohol plus 3 cc. of dry piperidine was refluxed for two hours. The product precipitated as a crystalline substance. After keeping at 0° C. for a while, the 1-methyl-4-(2,5-dichlorostyryl)pyridinium iodide was collected by filtration, washed, dried and recrystallized from a 1:1 mixture of methanol and water; M. P. 265–267° C.

*Example 13*

A mixture of 52.5 g. of 2,4-dichlorobenzaldehyde, 70.5 g. of γ-picoline methiodide, 5 cc. of dry piperidine and 150 cc. of absolute alcohol was refluxed for thirteen hours and cooled. A first, an oil separated and after keeping at 0° C. for a while, the product crystallized. It was filtered, washed with ethanol, methanol and acetone to obtain a brown substance. The 1-methyl-4-(2,4-dichlorostyryl)pyridinium iodide was recrystallized from a mixture of methanol, water and a trace of hydrochloric acid; M. P. 231–235° C.

*Examples 14 to 16*

By a procedure analogous to that described in Example 10, the following additional compounds were synthesized:

1-methyl-4-(2,6-dichlorostyryl)pyridinium iodide, yellow crystals melting at 236–240° C., was prepared from γ-picoline methiodide and 2,6-dichlorobenzaldehyde.

1-methyl-4-(3,5-dichlorostyryl)pyridinium iodide, M. P. 277–283° C., was prepared from γ-picoline methiodide and 3,5-dichlorobenzaldehyde.

1-ethyl-4-(2,4-dichlorostyryl)pridinium iodide, M. P. 198–200° C., was prepared from γ-picoline ethiodide and 2,4-dichlorobenzaldehyde. The γ-picoline ethiodide was prepared by refluxing molecular equivalents of γ-picoline and ethyl iodide in benzene for two hours. Upon cooling, the oil crystallized and the resultant γ-picoline ethiodide was very hygroscopic.

*Example 17*

Molecular equivalents of n-dodecyl bromide and γ-picoline was heated at 135° C. for 24 hours. The oil was shaken with dry ether to remove the unreacted products and then γ-picoline n-dodecyl bromide crystallized.

A solution of 34.2 g. of γ-picoline n-didecyl bromide and 17.5 g. of 2,4-dichlorobenzaldehyde in 75 cc. of absolute alcohol containing 5 cc. of piperidine was refluxed for 9 hours. Upon cooling, a dark colored substance precipitated which became orange upon repeated washing with ether. The 1-n-dodecyl-4-(2,4-dichlorostyryl)-pyridinium bromide was recrystallized (as the monohydrate) from a water-alcohol mixture, M. P. 197–198° C.

I claim:

1-Methyl-4-(2,5-dichlorostyryl)pyridinium iodide.

References Cited in the file of this patent

UNITED STATES PATENTS

| | | |
|---|---|---|
| 2,255,077 | Middletown | Sept. 9, 1941 |
| 2,320,654 | Reister | June 1, 1943 |
| 2,388,782 | Reister | Jan. 11, 1944 |
| 2,482,421 | Smith | Sept. 20, 1949 |
| 2,558,777 | Papa | July 3, 1951 |
| 2,616,890 | Smith | Nov. 4, 1952 |
| 2,639,282 | Sprague | May 19, 1953 |

OTHER REFERENCES

Chem. Berichte 84 (1951), pp. 399–411.
Philips: J. Org. Chem. 1947, pp. 333–41.